United States Patent

Knight et al.

[15] 3,692,939

[45] Sept. 19, 1972

[54] TEST ARRANGEMENT FOR DATA MODEM

[72] Inventors: Patrick E. Knight, Lynchburg; Raymond D. Stapleton, Forest, both of Va.

[73] Assignee: General Electric Company

[22] Filed: April 5, 1971

[21] Appl. No.: 130,929

[52] U.S. Cl........179/2 DP, 179/15 BF, 179/175.1 R

[51] Int. Cl........................................H04m 11/00

[58] Field of Search .179/2 DP, 15 BF, 175, 175.1 R, 179/175.2 R, 175.25, 175.3, 175.31

[56] References Cited

UNITED STATES PATENTS

| | | | |
|---|---|---|---|
| 3,371,165 | 2/1968 | Earle | 179/175.3 |
| 3,571,530 | 3/1971 | Davies | 179/175.2 R |

*Primary Examiner*—Kathleen H. Claffy
*Assistant Examiner*—David L. Stewart
*Attorney*—James J. Williams, Frank L. Neuhauser, Oscar B. Waddell and Joseph B. Forman

[57] ABSTRACT

A data modem is provided with loop-back circuits between the modem transmitter and receiver. If the modem is operating, the loop-back circuits cause oscillations. In addition, the oscillations can also indicate the operating condition of the modem so that adjustments can be made if needed.

5 Claims, 2 Drawing Figures

INVENTORS:
PATRICK E. KNIGHT,
RAYMOND D. STAPLETON,
BY James J. Williams
THEIR ATTORNEY.

TEST ARRANGEMENT FOR DATA MODEM

BACKGROUND OF THE INVENTION

Our invention relates to a test arrangement for a data modem, and particularly to such a test arrangement that is relatively simple, that can be easily contained in the modem itself, and that gives a relatively comprehensive indication of the actual operation of the modem.

Data modems are used extensively to connect data terminal equipment, such as a printer or typewriter, to a telephone line which, in turn, is connected to distant data terminal equipment. As in the case of any electronic equipment, such modems should be frequently checked to be sure that they are operating properly, and adjustments should be made to correct the operation if necessary. Or, if such modems are not operating properly, some indication is needed so that the modem can be checked so as to determine and correct the fault.

Accordingly, an object of our invention is to provide a new and improved test arrangement for data modems.

Another object of our invention is to provide a new and improved data modem test arrangement that is relatively simple and reliable in operation.

Previously known data modem test arrangements that we are aware of have included a relatively large amount of complex equipment. While such equipment provides a relatively comprehensive indication of the data modem operation, the equipment is relatively large and complex, and requires relatively extensive knowledge and background for a person to operate it. Frequently, the fault and needed adjustment or correction in the data modem is one which can be found without such complex equipment and extensive knowledge.

Accordingly, another object of our invention is to provide a data modem test arrangement which is relatively simple, which can be included in the modem itself, and which is relatively easy to operate by a person having relatively little knowledge and background in electronics.

SUMMARY OF THE INVENTION

Briefly, these and other objects are achieved in accordance with our invention by an arrangement which loops the alternating current line output of the data modem transmitter to the alternating current line input of the data modem receiver, and which loops the direct current data output of the receiver to the direct current data input of the transmitter. These loops cause the modem to oscillate, and a direct current voltmeter connected to the direct current data loop will indicate if the modem is operating. If, as we prefer, the voltmeter has a center zero indication and plus and minus indications, the receiver bias can be indicated and adjusted.

BRIEF DESCRIPTION OF THE DRAWING

The subject matter which we regard as our invention is particularly pointed out and distinctly claimed in the Claims. The structure and operation of our invention, together with further objects and advantages, may be better understood from the following description given in connection with the accompanying drawing, in which:

DESCRIPTION OF THE PREFERRED EMBODIMENT

Figure 1:
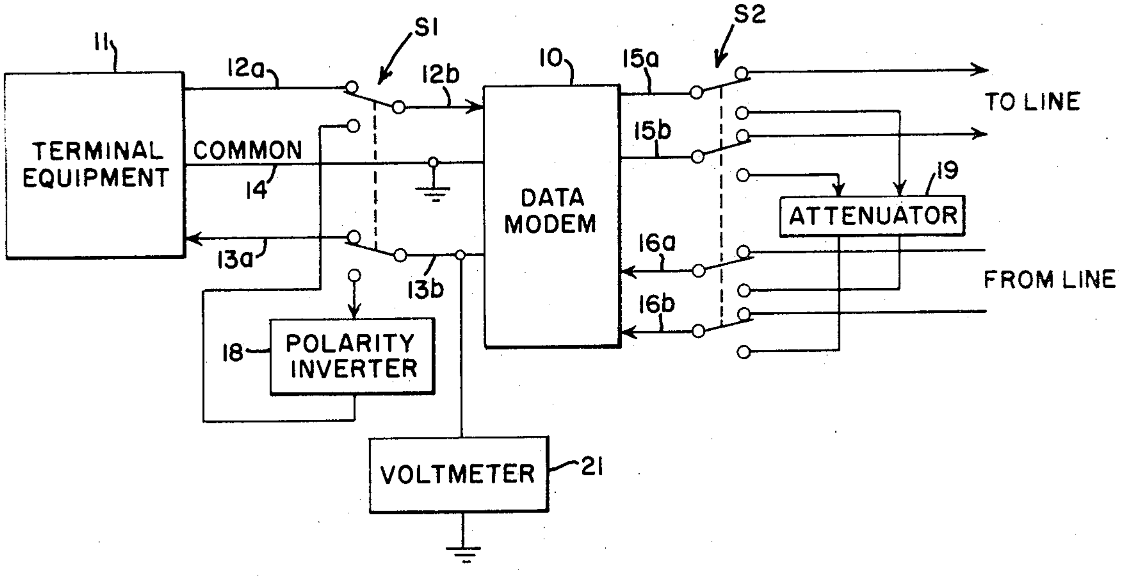
FIG. 1 shows a schematic block diagram of a data modem test arrangement in accordance with our invention.

In FIG. 1, we show a data modem 10 indicated by a block. As known in the art, such a data modem includes a transmitter and a receiver to connect terminal equipment 11, such as a printer or other device, to a telephone line or communication circuit. Typically, the terminal equipment 11 sends and receives direct current pulses indicative of information or intelligence. A mark, a logic 1, or some other indication may be indicated by a first direct current voltage; and a space, a logic 0, or some other indication may be indicated by a second direct current voltage that is different or distinct from the first voltage. One of the two voltages may be zero. In the transmitter part of the data modem 10, direct current signals provided by the terminal equipment 11 are converted to alternating current signals which, typically, are in the voice frequency range so that they can be transmitted over a telephone line or other communication circuit to distant equipment. In the receiver part of the data modem 10, alternating current signals from distant equipment are converted to direct current signals for application to the terminal equipment 11. On the direct current or data side of the data modem 10, a line **12*a*, 12*b* connects the output of the terminal equipment 11 to the transmitter input of the data modem 10; and a line 13*b*, 13*a* connects the receiver output of the data modem 10 to the input of the terminal equipment 11. These lines 12*a*, 12*b*, 13*a*, 13*b* usually operate with respect to a common grounded line 14. Direct current signals on the lines 12*b*, 14 are converted to alternating current signals by the transmitter of the data modem 10, and these alternating current signals are supplied to a balanced pair of wires 15*a*, 15*b* for transmission over a telephone line or circuit. Alternating current signals from a distant point are supplied by the telephone line or circuit over a balanced pair of wires 16*a*, 16*b* to the data modem 10. These alternating current signals are converted to direct current signals by the receiver of the data modem 10. These direct current signals are supplied to the lines 13*b*, 14 for application to the terminal equipment 11**. The circuit described thus far is known in the art, and further explanation is not believed necessary.

The data modem 10 and the terminal equipment 11 described above are frequently used or operated by office and business personnel who do not have much knowledge about the equipment (and do not need to), and who have previously been unable to make even a fundamental test of or adjustment on such equipment. For this reason, many data modem manufacturers have had to supply relatively complex test equipment, and this equipment has required relatively skilled personnel to operate it so as to test and adjust data modem equipment. Such equipment and skilled personnel are relatively expensive. Where a data modem became faulty, we have frequently found that only a minor adjustment was required in order to make the data modem completely operable again. Accordingly, we have provided an improved test arrangement which can be easily included in the data modem, and which can be operated by a person of almost no electronic skill. This test arrangement includes a double-pole, double-throw switch S1 connected on the data side of the data modem 10, and a four-pole, double-throw switch S2 connected on the line side of the data modem 10. Normally, with the data modem 10 operating, both switches S1, S2 have their movable contacts or arms in the upper position to engage the upper fixed contacts as shown so that the terminal equipment 11 is connected to the data modem 10, and so that the data modem 10 is connected to the telephone line or circuit. When the data modem 10 is to be tested in accordance with our invention, both switches S1, S2 are operated so that their movable contacts or arms are moved downward and engage their respective lower fixed contacts. With respect to the switch S1, this then connects the direct current data output line **13*b* to the input of a polarity inverter 18. The polarity inverter 18 is a device which may take various forms, and which simply provides a polarity inversion of the direct current signals applied to it. Thus, if a positive direct current signal is applied to the polarity inverter 18, the inverter 18 produces a negative direct current signal. Conversely, if a negative direct current signal is applied to the inverter 18, the inverter 18 produces a positive direct current signal. The output of the inverter 18 is connected through the upper arm of the switch S1 to the direct current data input line 12*b* of the data modem 10. With respect to the switch S2, when it is operated to its lower or test position, the two transmitter output lines 15*a*, 15*b* are connected through an attenuator 19 back to the receiver input lines 16*a*, 16*b*. The attenuator 19 simply provides sufficient attenuation so that the relatively high level alternating current output signals from the transmitter of the data modem 10 are reduced to an appropriate level for application to the receiver of the data modem 10. With these connections, any signal produced at the output lines 15*a*, 15*b* is connected back to the input line 16*a*, 16*b*. And any direct current signal produced at the line 13*b* is inverted in polarity by the polarity inverter 18, and this inverted polarity signal is then applied to the line 12*b*. Thus, a regenerative circuit is established, and, if the modem 10 is operating properly, oscillations will result. With these oscillations, the lines 12*b*, 13*b* will fluctuate at some relatively high rate between a positive direct current voltage and a negative direct current voltage. These fluctuations can be indicated by a suitable indicating device, such as a direct current voltmeter 21. Typically, such a voltmeter has a damped movement, so its needle or indicator will quiver or fluctuate slightly about some center position. If this quivering or vibration is present, it will indicate that the modem 10 is operating. If there is no quivering or fluctuation of the meter needle, this can indicate that there is insufficient gain around the regenerative circuit to cause oscillations. Adjustments of the transmitter or the receiver gain, or both the transmitter and the receiver gains, within predesigned limits, may be provided on the data modem 10. If the gain or gains are raised enough to cause oscillations, the data modem 10 may be made operable. As will be described in greater detail below, we prefer that the voltmeter 21 be the type having a center zero position with a negative or minus indication on one side of the zero position, and a positive or plus indication on the other side of the zero position. Then, if the data modem 10** is improperly biased, an adjustment can be made.

Figure 2:
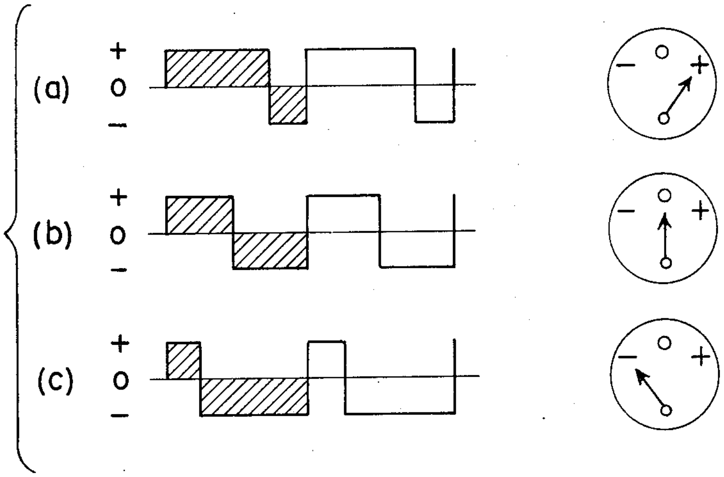
FIG. 2 shows waveforms illustrating the indications which can be provided by our test arrangement shown in FIG. 1.

FIG. 2 shows waveforms which are plotted against time, and which illustrate the direct current variations present in the lines **12*b*, 13*b* when the data modem 10 is connected in our test arrangement. In FIG. 2*a*, we have assumed that the data modem 10 is biased too far in the positive direction. The waveforms vary about zero in positive and negative directions, but the area of the waveform on the positive side exceeds the area of the waveform on the negative side as indicated by the shaded portions. Hence, the voltmeter 21 will have the positive indication as shown in FIG. 2*a*. In FIG. 2*b*, we have assumed that the biasing adjustment for the modem 10 is correct, so that the positive and negative areas of the waveform are equal, and the voltmeter indicates zero as shown. And, in FIG. 2*c*, we have assumed that the modem 10 is biased too far in the negative direction, so that the negative area of the waveform exceeds the positive area, and the voltmeter has a negative indication as shown in FIG. 2*c*. The voltmeter 21 can be provided right in the modem, itself, so that when the test arrangement is provided by operating the switches S1, S2, an indication of whether the modem is operating is shown by a vibration or quivering of the voltmeter needle, and an indication of the bias adjustment is provided by the voltmeter needle position. Typically, a modem has an easily accessible adjustment for correcting the bias so that a person of relatively little skill can adjust the bias to the correct setting as indicated by the needle being centered at the zero position as shown in FIG. 2*b***.

It will thus be seen that our invention provides a relatively simple but effective test arrangement for data modems. Our test arrangement is relatively inexpensive and can be easily and quickly used by a relatively inexperienced and unskilled person. Further, our test can be made independently of the telephone line, so that a line connection is not required. Our test arrangement provides an operating or dynamic indication, which is typically more accurate and significant than a static test indication. And finally, our test arrangement is very simple in that it requires only inexpensive switches and a relatively inexperienced voltmeter. While we have shown only one embodiment, persons skilled in the art will appreciate that modifications may be made. For example, the switches S1, S2 may be all ganged together so that only a single operation of a switch lever is required for tests. Or, each of the switch arms or movable contacts may be independently operated. Also, the switches 51, 52 may be either manual or relay operated. Relay operation may be desirable where a data modem at a remote location is to be tested from a position not at the remote location. And finally, the voltmeter 21 may take various forms, and may be connected at almost any point in the direct current loop-back circuit. Therefore, while our invention has been described with reference to a particular embodiment, it is to be understood that modifications may be made without departing from the spirit of the invention or from the scope of the claims.

What we claim as new and desire to secure by Letters Patent of the United States is:

1. In a data modem having a transmitter with a direct current data input and an alternating current line output, and having a receiver with an alternating current line input and a direct current data output, an improved arrangement for testing said data modem comprising:

a. first means for selectively connecting said alternating current line output of said transmitter to said alternating current line input of said receiver;

b. second means for selectively connecting said direct current data output of said receiver to said direct current data input of said transmitter in reverse-polarity fashion;

c. and indicating means connected to said second means for indicating the operation of said data modem in response to the self-oscillations produced as a result of the connections provided by said first and second connecting means.

2. The improved testing arrangement of claim 1 wherein said indicating means comprises a direct current voltmeter that has a zero indication, a positive indication, and a negative indication.

3. The improved testing arrangement of claim 1 wherein said first means disconnect any communication circuit from said modem in response to said alternating current line output of said transmitter being connected to said alternating current line input of said receiver, and wherein said second means disconnect any terminal equipment from said modem in response to said direct current data output of said receiver being connected to said direct current data input of said transmitter.

4. The improved testing arrangement of claim 3 wherein said indicating means comprise a direct current voltmeter that has a zero indication, a positive indication, and a negative indication.

5. The improved testing arrangement of claim 4 wherein said first and second connecting means operate simultaneously.

* * * * *